(12) United States Patent
Lee et al.

(10) Patent No.: US 7,393,403 B2
(45) Date of Patent: Jul. 1, 2008

(54) PROCESS FOR PREPARING SELF-DISPERSIBLE COLORING AGENT USING LEWIS ACIDS AND INK COMPOSITION COMPRISING THE COLORING AGENT

(75) Inventors: Jong-in Lee, Suwon-si (KR); Seung-min Ryu, Yongin-si (KR); Su-aa Jung, Suwon-si (KR)

(73) Assignee: Samsung Eletronics Co., Ltd., Suwon-Si (KR)

( * ) Notice: Subject to any disclaimer, the term of this patent is extended or adjusted under 35 U.S.C. 154(b) by 879 days.

(21) Appl. No.: 10/926,953

(22) Filed: Aug. 27, 2004

(65) Prior Publication Data

US 2005/0066856 A1    Mar. 31, 2005

(30) Foreign Application Priority Data

Sep. 26, 2003  (KR) .................... 10-2003-0066947

(51) Int. Cl.
    *C09D 11/02* (2006.01)
(52) U.S. Cl. .................. 106/493; 106/31.6; 106/31.43; 106/31.75; 106/31.46; 106/31.47; 106/31.49; 106/31.76; 106/31.77; 106/31.78; 106/499
(58) Field of Classification Search ............... 106/31.27, 106/31.6, 31.43, 31.75, 31.46, 31.47, 31.49, 106/31.76, 31.77, 31.78, 493, 499
See application file for complete search history.

(56) References Cited

U.S. PATENT DOCUMENTS

| | | | |
|---|---|---|---|
| 3,687,887 A | 8/1972 | Zabiak | |
| 4,697,794 A | 10/1987 | Brenner et al. | |
| 4,959,661 A | 9/1990 | Buxton et al. | |
| 5,085,698 A | 2/1992 | Ma et al. | |
| 5,106,417 A | 4/1992 | Hauser et al. | |
| 5,125,968 A | 6/1992 | Takimoto et al. | |
| 5,160,370 A | 11/1992 | Suga et al. | |
| 5,172,133 A | 12/1992 | Suga et al. | |
| 5,184,148 A | 2/1993 | Suga et al. | |
| 5,221,334 A | 6/1993 | Ma et al. | |
| 5,229,786 A | 7/1993 | Suga et al. | |
| 5,589,522 A | 12/1996 | Beach et al. | |

*Primary Examiner*—J. A. Lorengo
*Assistant Examiner*—Veronica Faison-Gee
(74) *Attorney, Agent, or Firm*—Staas & Halsey LLP

(57) ABSTRACT

A self-dispersible coloring agent represented by formula (II) below is prepared by incorporating a hydrophilic group into a coloring agent through a reaction of a hydrophilic group-containing halide represented by formula (I) below and the coloring agent in the presence of a Lewis acid catalyst:

X-L-R¹    (I)

(the coloring agent)-L-R¹    (II)

wherein L represents a single bond or —C(=O)—; $R^1$ is selected from the group consisting of a substituted or unsubstituted $C_1$-$C_{20}$ alkyl group containing a hydrophilic group, a substituted or unsubstituted $C_6$-$C_{20}$ aryl group containing a hydrophilic group a substituted or unsubstituted $C_2$-$C_{20}$ heteroaryl group containing a hydrophilic group and a substituted or unsubstituted $C_7$-$C_{20}$ arylalkyl group containing a hydrophilic group; and X is one of: —F, —Br, —I and —Cl. may be obtained conveniently through a one-step process. The ink composition containing the self-dispersible coloring agent provides effective long-term storage stability and dispersion stability using a one-step process.

26 Claims, No Drawings

PROCESS FOR PREPARING SELF-DISPERSIBLE COLORING AGENT USING LEWIS ACIDS AND INK COMPOSITION COMPRISING THE COLORING AGENT

CROSS-REFERENCE TO RELATED APPLICATIONS

This application claims the priority of Korean Patent Application No. 2003-66947, filed on Sep. 26, 2003, in the Korean Intellectual Property Office, the disclosure of which is incorporated herein in its entirety by reference.

BACKGROUND OF THE INVENTION

1. Field of the Invention

The present invention relates to a process for preparing a self-dispersible coloring agent and an ink composition comprising the coloring agent, more particularly, to a process of preparing a self-dispersible coloring agent by incorporating a hydrophilic group into the coloring agent through a reaction of a hydrophilic group-containing halide and the coloring agent in the presence of a Lewis acid as a catalyst.

2. Description of the Related Art

In general, coloring agents embody their inherent colors by selectively absorbing or reflecting visible light, and are classified as dyestuffs and pigments.

Dyestuffs are dissolved in solvents, and are used in any materials to be dyed, such as fibers, leathers, furs, papers, thus providing considerable fastness to daylight, washing, friction, and the like. Pigments are insoluble in solvents, are coloring agents in the form of particulates, and are not absorbed into the material to be dyed, but are adhered to the surface of the material to be dyed by physical means (e.g., adhesion, and the like), thus providing their inherent colors.

In preparing a pigment-type ink, dispersing a pigment comprising a coloring agent in a solvent is generally carried out. Herein, the size of pigment particles, the distribution of the particle size and the dispersion stability are important factors influencing an efficient dispersion of the pigment. Even if the pigment particles dispersed through the dispersing step described above are stored for a long term or are exposed to the change of environmental factors, such as a change of temperature, aggregation or precipitation of the pigment particles should not occur.

Most pigment-type black inks use a carbon black as a coloring agent. A method for dispersing a carbon black in a solvent for ink using a dispersing agent includes a dispersing method using a styrene-maleic acid anhydride copolymer disclosed in U.S. Pat. No. 3,687,887, or a dispersing method using a hydrophobic polymer dispersing agent containing a hydrophilic group such as a carboxylic acid, a sulfonic acid or a sulfate disclosed in U.S. Pat. No. 4,697,794. A random copolymer that contains a hydrophilic group by incorporating a carboxylic acid is used as a dispersing agent in U.S. Pat. Nos. 5,229,786; 5,172,133; 5,160,370; 5,184,148; or 5,106,417. U.S. Pat. Nos. 5,085,698 and 5,221,334 use an AB-type block copolymer or a BAB-type block copolymer (herein, A is a hydrophilic monomer and B is a hydrophobic monomer) in which a hydrophilic monomer and a hydrophobic monomer are used, as a dispersing agent, U.S. Pat. No. 5,589,522 uses a graft polymer and U.S. Pat. Nos. 4,959,661 and 5,125,968 use a known emulsifying agent.

When using a dispersing agent in order to disperse a carbon black, the dispersing agent is readily available since a general dispersing agent may be used. However, when using a water-soluble dispersing agent to disperse a carbon black pigment in a water-soluble medium, the water-soluble dispersing agent may be adsorbed physically to a surface of the carbon black, and thus, the dispersing effect of the pigment may be obtained only with an excessive amount of the dispersing agent. Thus, since an excessive amount of the water-soluble dispersing agent must be used compared to the amount of the pigment to be dispersed, the overall dispersion efficiency is decreased. Since the dispersing agent does not bind to the pigment efficiently and stably, the dispersion stability becomes ineffective. Thus, when preparing ink using the dispersing agent, long-term storage stability is decreased such that a particle dispersed in the ink is prone to aggregation or precipitation. When a block copolymer and a graft copolymer are used as a dispersing agent, a high cost is required in preparing the dispersing agent. When using a general emulsifying agent, excessive foam occurs during the dispersion process.

To solve the problem incurred when using the dispersing agent and the emulsifying agent, improving dispersion of a carbon black by surface modification of the carbon black was implemented. U.S. Pat. Nos. 5,630,868 and 5,672,198 disclose the method of modifying a carbon black pigment to form a self-dispersible pigment by incorporating a hydrophilic group into the surface of the carbon black through the reaction of the carbon black pigment with a diazonium salt.

However, according to the method, an aromatic amine is required to be in the distal end of a compound that contains a hydrophilic group and reacts with a pigment to transport the hydrophilic group to the pigment. However, such hydrophilic group-containing aromatic amine compounds are difficult to obtain commercially, and the aromatic compound should be reacted with a carbon black after converting the compound to a diazonium salt. Thus, a plurality of reaction processes, not a single reaction process, are required, and the complexity of the process and the cost of the process are increased.

Thus, there is a need for a self-dispersible coloring agent which is easily dispersed in an aqueous liquid medium without using other dispersing agents, which has superior storage stability and dispersion stability, and in which the characteristics of a coloring agent, such as an ability to embody a color, durability, light resistance, and the like are improved, and an ink composition comprising the same.

SUMMARY OF THE INVENTION

The present invention includes a process of preparing a self-dispersible coloring agent represented by formula (II) below by incorporating a hydrophilic group into a coloring agent through a reaction of a hydrophilic group-containing halide represented by formula (I) below and the coloring agent in the presence of a Lewis acid catalyst:

$\text{X-L-R}^1$          (I)

(the coloring agent)-L-$R^1$          (II)

wherein L represents a single bond or —C(=O)—;

$R^1$ is selected from the group consisting of a substituted or unsubstituted $C_1$-$C_{20}$ alkyl group containing a hydrophilic group, a substituted or unsubstituted $C_6$-$C_{20}$ aryl group containing a hydrophilic group, a substituted or unsubstituted $C_2$-$C_{20}$ heteroaryl group containing a hydrophilic group and a substituted or unsubstituted $C_7$-$C_{20}$ arylalkyl group containing a hydrophilic group; and X is one of: —F, —Br, —I and —Cl.

The hydrophilic group is selected from the group consisting of —OA, —COOA, —$SO_2$A, —$SO_2NH_2$, —$SO_2NHCOT^1$, -$T^2SO_2A$, —$SO_3A$, —$PO_3NH_2$, —$PO_3A_2$, —$NH_2$ and —$N(T^1)_2$, wherein A is selected from the group consisting of a hydrogen atom, an alkali metal, and -$Q^1Q^2Q^3Q^4$ in which $Q^1$, $Q^2$, $Q^3$ or $Q^4$ are each a hydrogen atom, a $C_1$-$C_{20}$ alkyl group or a $C_6$-$C_{20}$ aryl group; $T^1$ is a $C_1$-$C_{20}$ alkyl group, a $C_6$-$C_{20}$ aryl group or a $C_2$-$C_{20}$ heteroaryl group; and $T^2$ is a $C_1$-$C_{20}$ alkylene group, a $C_6$-$C_{20}$ arylene group or a $C_2$-$C_{20}$ heteroarylene group.

According to another aspect of the present invention, an ink composition comprises a self-dispersible coloring agent prepared by the process.

According to the present method, a self-dispersible coloring agent may be obtained readily and conveniently through a one-step reaction. A self-dispersible coloring agent prepared by the process of the present invention is readily dispersed in an aqueous medium without other dispersing agents, and provides a superior storage stability and dispersion stability, as well as an improved ability of embodying a color, durability, light resistance, and the like.

Additional aspects and/or advantages of the invention will be set forth in part in the description which follows and, in part, will be obvious from the description, or may be learned by practice of the invention.

DETAILED DESCRIPTION OF THE PREFERRED EMBODIMENTS

The present invention will be described in more detail by describing embodiments thereof.

According to an aspect of the present invention, a process of preparing a self-dispersible coloring agent represented by formula (II) below incorporates a hydrophilic group into a coloring agent through a reaction of a hydrophilic group containing a halide represented by formula (I) below and the coloring agent in the presence of a Lewis acid catalyst:

X-L-$R^1$      (I)

      (II)

(a coloring agent)-L-$R^1$ wherein L represents a single bond or —C(=O)—;

$R^1$ is selected from the group consisting of a substituted or unsubstituted $C_1$-$C_{20}$ alkyl group containing a hydrophilic group, a substituted or unsubstituted $C_6$-$C_{20}$ aryl group containing a hydrophilic group, a substituted or unsubstituted $C_2$-$C_{20}$ heteroaryl group containing a hydrophilic group and a substituted or unsubstituted $C_7$-$C_{20}$ arylalkyl group containing a hydrophilic group; and X is one of: —F, —Br, —I and —Cl.

The coloring agent of formula (II) prepared by the process is a self-dispersible coloring agent in which a hydrophilic group is incorporated on a surface of the coloring agent.

The hydrophilic group undergoes electrostatic interaction with an aqueous medium after incorporation in a pigment, such that the pigment containing the group may be easily dispersed in the aqueous medium without other dispersing agents. Such a hydrophilic group may be —OA, —COOA, —$SO_2A$, —$SO_2NH_2$, —$SO_2NHCOT^1$, -$T^2SO_2A$, —$SO_3A$, —$PO_3NH_2$, —$PO_3A_2$, —$NH_2$ or —$N(T^1)_2$, wherein A may be a hydrogen atom, an alkali metal, or —$NQ^1Q^2Q^3Q^4$ in which $Q^1$, $Q^2$, $Q^3$ or $Q^4$ are each a hydrogen atom, a $C_1$-$C_{20}$ alkyl group or a $C_6$-$C_{20}$ aryl group; $T^1$ is a $C_1$-$C_{20}$ alkyl group, a $C_6$-$C_{20}$ aryl group or a $C_2$-$C_{20}$ heteroaryl group; and $T^2$ is a $C_1$-$C_{20}$ alkylene group, a $C_6$-$C_{20}$ arylene group or a $C_2$-$C_{20}$ heteroarylene group. However, such a hydrophilic group is not limited to the above examples, and any hydrophilic group may be utilized that does not affect adversely self-dispersibility of the self-dispersible coloring agent of the present invention. For example, the hydrophilic group may be —OH, —COOH, —$SO_2H$, —$SO_2NH_2$, —$SO_2NHCOCH_3$, —$(CH_2)SO_2H$, —$SO_3H$, —$PO_3NH_2$, —$PO_3H_2$, —$NH_2$ or —$N(CH_3)_2$.

In formulas (I) and (II), $R^1$ may be a $C_1$-$C_{12}$ alkyl group; a $C_1$-$C_{12}$ alkyl group containing phenyl group or naphthyl group in the distal end; or a phenyl group or a naphthyl group. The $R^1$ may have at least one hydrophilic group described above that does not affect adversely self-dispersibility of a self-dispersible pigment.

The coloring agent may react with a hydrophilic group-containing halide in the presence of a Lewis acid catalyst, may be a coloring agent comprising a $C_6$-$C_{15}$ aryl group or a $C_2$-$C_{15}$ heteroaryl group, and may be specifically a coloring agent comprising a ring of benzene, naphthalene, pyridine, purane, thiophene or pyrrole.

The coloring agent may be a carbon black, a graphite, a vitreous carbon, an activated charcoal, an activated carbon, an anthraquinone, a phthalocyanine blue, a phthalocyanine green, a diazo, a monoazo, a pyranthrone, a phenylene, a quinacridone, an indigoid pigment, or the like, but it is not limited to these.

In formulas (I) and (II), the unsubstituted $C_1$-$C_{20}$ alkyl group may be a methyl, an ethyl, a propyl, an isobutyl, a sec-butyl, a pentyl, an iso-amyl, a hexyl, or the like, and at least one hydrogen atom in the alkyl group may be substituted with a halogen atom, a hydroxy group, a nitro group, a cyano group, an amino group, an amidino group, a hydrazine, a hydrazone, a carboxyl group or its salt, a sulfonic acid or its salt, a phosphoric acid or its salt, or a $C_1$-$C_{20}$ alkyl group, an alkenyl group, an alkinyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

An aryl group in formulas (I) and (II) is used alone or in combination, and refers to a $C_6$-$C_{20}$ carbocyclic aromatic system including at least one ring which may be attached or fused together in a pendant way. The term aryl refers to an aromatic radical such as a phenyl, a naphthyl or a tetrahydronaphthyl. The aryl group includes a substituent group such as a haloalkylene, a nitro, a cyano, an alkoxy or a lower alkylamiNo. At least one hydrogen atom in the arylene group may be substituted with the same substituent group as in the alkyl group described above.

The heteroaryl group of formulas (I) and (II) according to an embodiment of the present invention refers to a monovalent monocyclic or bicyclic aromatic bivalent organic compound in which 1, 2 or 3 hetero atoms selected from the group consisting of N, O, P and S are included, another atom in the ring is C, and the ring is a 6~20 membered ring. At least one hydrogen atom in the heteroaryl group may be substituted with the same substituent group as in the alkyl group.

The arylalkyl group of formulas (I) and (II) according to an embodiment of the present invention refers to a substituent group in which an aryl group or a heteroaryl group described above is included at a distal end of the $C_2$-$C_{14}$ alkyl group. At least one hydrogen atom in the alkyl group, the aryl group or the heteroaryl group may be substituted with the same substituent group as in the alkyl group.

A hydrophilic group-containing halide may be a halide represented by formula (III) below. It was found that this halide is particularly effective in preparing a self-dispersible carbon black pigment.

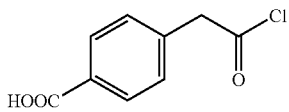

Another hydrophilic group-containing halide according to the present invention may be a halide represented by formula (IV) below. It was found that this halide is also particularly effective in preparing a self-dispersible carbon black pigment.

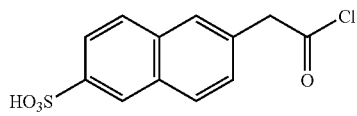

A Lewis acid used in preparing a self-dispersible coloring agent according to the present invention is a compound which shares an unshared electron pair of an atom having the unshared electron pair, thus forming a covalent bond with the atom, and may, for example, be $AlCl_3$, $FeCl_3$, $FeBr_3$, $SnCl_4$, $SbCl_5$, $ZnCl_2$, $BF_3$, $TiCl_4$, or the like, but is not limited to these. The amount of a Lewis acid used depends on the classes of the coloring agent and the hydrophilic group-containing halide, and 0.01 to 5 mole of the Lewis acid per 1 mole of the hydrophilic group-containing halide may be used. When less than 0.01 mole of the Lewis acid is used, the reaction has difficulty proceeding. When more than 5 moles of the Lewis acid is used, it is difficult to remove the unreacted Lewis acid, and the production cost increases. The temperature applied in preparing the self-dispersible coloring agent according to the present invention depends on the classes of the coloring agent, the hydrophilic group-containing halide, and a reaction solvent, and may be 60° C. to 200° C. The reaction of preparing the self-dispersible coloring agent according to the present invention depends on a boiling point of each solvent used, since the reaction proceeds under a reflux condition. The hydrophilic group is incorporated into the self-dispersible coloring agent prepared according to the embodiment of the present invention through a simplified one step process described above. Thus, such a self-dispersible coloring agent may be widely used in fibers, leathers, furs, papers, foods, medicines, cosmetics, ink-jet inks, printing inks, paints, plastics, rubbers, furniture manufacturing, textile printing, paper manufacturing, cosmetics manufacturing, ceramic industry, and the like.

According to another aspect of the present invention, an ink composition comprises a self-dispersible coloring agent prepared by the process described above.

The ink composition according to the present invention uses an aqueous liquid medium as a solvent. As the aqueous liquid medium, water is used alone, or in combination with at least an organic solvent to control viscosity and surface tension of the ink composition in proper range. The ink composition comprises 500 to 5,000 parts by weight of the aqueous liquid medium, and may comprise 1,000 to 3,000 parts by weight of the aqueous liquid medium based on 100 parts by weight of the self-dispersible coloring agent. When less than 500 parts by weight of the aqueous liquid medium is utilized in the ink composition, a coloring agent is prone to aggregation since its dispersion is not satisfactory. When the amount of the aqueous liquid medium exceeds 5,000 parts by weight, the amount of a coloring agent is ineffective in embodying a desired color. Those skilled in the art may determine routinely the amount of the organic solvent such that a self-dispersible coloring agent according to the present invention may be dispersed in the aqueous liquid medium effectively. However, 10 to 1,000 parts by weight of the organic solvent based on 100 parts by weight of the self-dispersible coloring agent may be used. The organic solvent may be one of a group of hydrocarbon solvents such as alcohols of methyl alcohol, ethyl alcohol, n-propyl alcohol, isopropyl alcohol, n-butyl alcohol, sec-butyl alcohol, t-butyl alcohol, isobutyl alcohol, and the like; ketones such as acetone, methylethylketone, diacetone alcohol, and the like; esters such as ethyl acetate, ethyl lactate, and the like; polyols such as ethylene glycol, diethylene glycol, triethylene glycol, propylene glycol, butylene glycol, 1,4-butanediol, 1,2,4-butanediol, 1,5-pentanediol, 1,2-hexanediol, 1,6-hexanediol, 1,2,6-hexanetriol, hexylene glycol, glycerol, glycerol ethoxylate, trimethylol propane ethoxylate, and the like; lower alkyl ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether; N-containing compounds such as 2-pyrrolidone, N-methyl-2-pyrrolidone, caprolactam, and the like; and dimethyl sulfoxide, tetramethylene sulfone, thioglycol, and the like.

The ink composition of embodiment of the present invention may further comprise additives such as a surfactant, a viscosity controller, a metal oxide, or an acid or a base, or the like.

The surfactant of the ink composition controls the surface tension of the ink composition to stabilize jetting at a nozzle. The surfactant performing such a function includes an anionic surfactant and a nonionic surfactant.

A nonionic surfactant refers to a surfactant that is not ionized, but is dissolved in water, and an anionic surfactant refers to a surfactant of which an anionic part ionized in water generally provides activity at an interface. The nonionic surfactant may be a polymeric active agent synthesized by block polymerization or graft polymerization of a hydrophilic unit with a hydrophobic unit such as a polyoxyethylene alkylether, a polyoxyethylene fatty acid ester, a polyoxyethylene aklkyl phenolether, a sorbitan fatty acid ester, a polyoxyethylene sorbitan fatty acid ester or a sucrose fatty acid ester, or the like.

The ink composition may include, in general, 0.1 to 5.0 parts by weight of a surfactant based on 100 parts by weight of the ink composition.

A viscosity controller controls viscosity to maintain smooth jetting, and a viscosity controller selected from the group consisting of polyvinyl alcohol, casein, and carboxymethyl cellulose is used. Those skilled in the art may easily determine the amount of the viscosity controller depending on the characteristics of the ink composition according to the present invention. However, the ink composition may include 0.1 to 5.0 parts by weight of a viscosity controller based on 100 parts by weight of the ink composition.

The ink composition may further comprise acids or bases. The acids or bases stabilize a pigment against a solvent. The ink composition may include 0.1 to 20 parts by weight of an acid or a base based on 100 parts by weight of the ink composition.

A method for preparing the ink composition is performed as follows.

First, a self-dispersing coloring agent, a surfactant, a viscosity controller, or the like is added to an aqueous liquid medium and then mixed. Thereafter, the mixture is filtered through a filter to obtain the ink composition according to an embodiment of the present invention.

The self-dispersible coloring agent, according to the present invention, may be used in toner compositions, various paints, coating liquids, and the like, in addition to ink compositions, and the coloring agent is not particularly limited.

The present invention will be described in greater detail with reference to the following examples. The following examples are for illustrative purposes and are not intended to limit the scope of the invention.

In the following examples, the embodiments of the present invention are evaluated with respect to their characteristics in ink, and these evaluation methods may also be applied to wet toners, dry toners, paints and/or coating liquids, in addition to ink. Hereinafter, only an ink composition is described as representative of the examples with respect to the ink composition in which the self-dispersible coloring agent are comprised, and the present invention is not limited to an ink composition.

PREPARATION EXAMPLE 1

Preparation of a Self-dispersible Carbon Black Pigment Using the Halide of Formula (III)

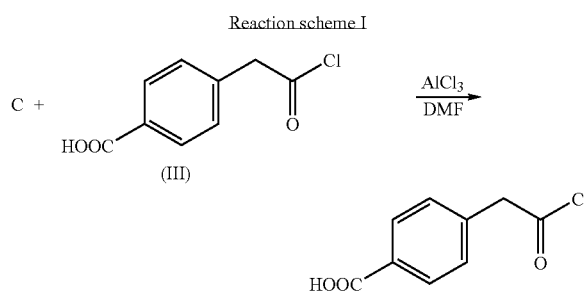

Hereinafter, in the reaction schemes, "C" represents a carbon black pigment.

According to the reaction scheme I, 10.2 g of a carbon black pigment (FW-18, manufactured by DEGUSSA CO.), 11.6 g of a halide of formula (III), 7.8 g of AlCl₃ and 100 ml of DMF (dimethylformamide) were placed into a 250 ml round bottom flask and reacted with refluxing under reduced pressure for 6 hours. An organic layer of the reaction mixture was extracted with a cyclohexane, and the extract was concentrated to obtain 16.5 g of the self-dispersible carbon black pigment of the Reaction scheme I.

PREPARATION EXAMPLE 2

Preparation of a Self-dispersible Carbon Black Pigment Using the Halide of Formula (IV)

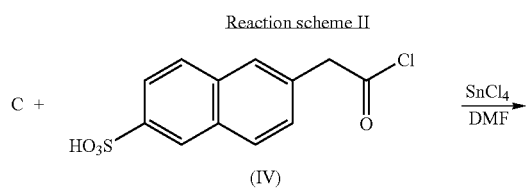

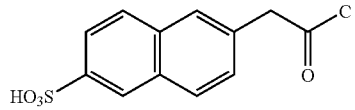

According to the reaction scheme II, 10.3 g of a carbon black pigment (REGAL 330, manufactured by CABOT CO.), 12.4 g of a halide of formula (IV), 13.8 g of SnCl₄ and 100 ml of DMF were placed into a 250 ml round bottom flask and reacted with refluxing under reduced pressure for 6 hours. An organic layer of the reaction mixture was extracted with a cyclohexane, and the extract was concentrated to obtain 17.8 g of the self-dispersible carbon black pigment of the Reaction scheme II.

PREPARATION EXAMPLE 3

Preparation of a Self-dispersible Carbon Black Pigment Using the Halide of Formula (V)

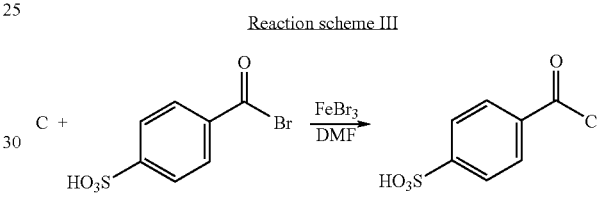

According to the reaction scheme III, 10.4 g of a carbon black pigment (RAVEN 5250, manufactured by COLUMBIAN CO.), 11.9 g of a halide of formula (V), 10.9 g of FeBr₃ and 100 ml of DMF were placed into a 250 ml round bottom flask and reacted with refluxing under reduced pressure for 7 hours. An organic layer of the reaction mixture was extracted with cyclohexane, and the extract was concentrated to obtain 18.4 g of the self-dispersible carbon black pigment of the Reaction scheme III.

PREPARATION EXAMPLE 4

Preparation of a Self-dispersible Carbon Black Pigment Using the Halide of Formula (VI)

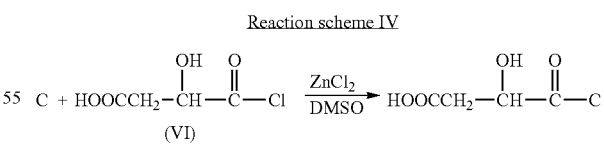

According to the reaction scheme IV, 10.0 g of a carbon black pigment (No. 25B, manufactured by MITSUBISHI CO.), 10.3 g of a halide of formula (VI), 9.2 g of ZnCl₂ and 100 ml of DMSO (dimethylsulfoxide) were placed into a 250 ml round bottom flask and reacted with refluxing under reduced pressure for 8 hours. An organic layer of the reaction mixture was extracted with a toluene, and the extract was concentrated to obtain 14.8 g of the self-dispersible carbon black pigment of the Reaction scheme IV.

PREPARATION EXAMPLE 5

Preparation of a Self-dispersible Carbon Black Pigment Using the Halide of Formula (VII)

Reaction scheme V

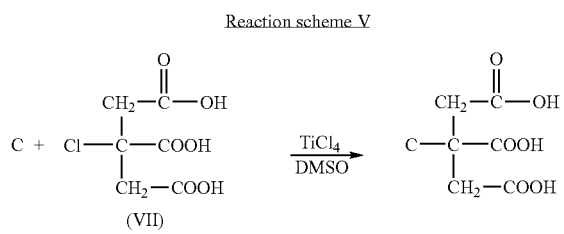

According to the reaction scheme V, 10.3 g of a carbon black pigment (No. 258, manufactured by MITSUBISHI CO.), 11.5 g of a halide of formula (VII), 10.4 g of $TiCl_4$ and 100 ml of DMSO were placed into a 250 ml round bottom flask and reacted with refluxing under reduced pressure for 8 hours. An organic layer of the reaction mixture was extracted with a toluene, and the extract was concentrated to obtain 17.1 g of the self-dispersible carbon black pigment of the Reaction scheme V.

PREPARATION EXAMPLE 6

Preparation of a Self-dispersible Carbon Black Pigment Using the Halide of Formula (VIII)

Reaction scheme VI

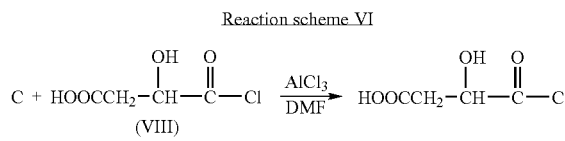

According to the reaction scheme VI, 10.2 g of a carbon black pigment (VALCAN XC-72R, manufactured by CABOT CO.), 12.1 g of a halide of formula (VIII), 10.6 g of $AlCl_3$ and 100 ml of DMF were placed into a 250 ml round bottom flask and reacted with refluxing under reduced pressure for 7 hours. An organic layer of the reaction mixture was extracted with a cyclohexane, and the extract was concentrated to obtain 15.2 g of the self-dispersible carbon black pigment of the Reaction scheme VI.

PREPARATION EXAMPLE 7

Preparation of a Self-dispersible Pigment Using the Compound of Formula (IX)

Reaction scheme VII

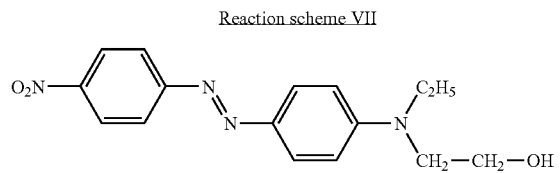

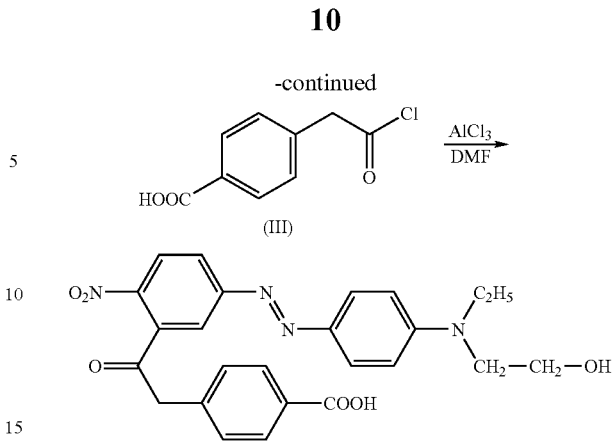

According to the reaction scheme VII, 10.2 g of a monoazo-based pigment (C.I. DISPERSE RED 1), 11.8 g of a halide of formula (III), 7.8 g of $AlCl_3$ and 100 ml of DMF were placed into a 250 ml round bottom flask and reacted with refluxing under reduced pressure for 8 hours. An organic layer of the reaction mixture was extracted with a cyclohexane, and the extract was concentrated to obtain 14.2 g of the self-dispersible pigment of the Reaction scheme VII.

EXAMPLE 1

Preparation of an Ink Composition Comprising a Self-dispersible Carbon Black Pigment The components described in Table 1 below were placed into a 250 ml beaker, were mixed and stirred sufficiently for more than 30 minutes. Then, the mixture was filtered through a 0.45 μm filter to obtain an ink composition.

TABLE 1

| Components | Amount (g) |
| --- | --- |
| A self-dispersible carbon black pigment prepared in preparation example 1 | 4.0 |
| Water | 77.0 |
| Diethylene glycol | 3.0 |
| Ethylene glycol | 8.0 |
| Glycerine | 8.0 |

EXAMPLES 2-6

An ink composition was prepared according to the same method used in Example 1, except that the self-dispersible carbon black pigment prepared in the preparation Examples 2 to 6 was respectively used instead of the self-dispersible carbon black pigment used in Example 1.

COMPARATIVE EXAMPLES 2-6

An ink composition was prepared according to the same method used in Example 1, except that the general carbon black pigment described in Table 2 below was respectively used instead of the self-dispersible carbon black pigment used in Example 1.

TABLE 2

| Comparative Example | Carbon black used |
|---|---|
| 1 | FW-18, manufactured by DEGUSSA CO. |
| 2 | REGAL 330, manufactured by CABOT CO. |
| 3 | RAVEN 5250, manufactured by RAVEN CO. |
| 4 | No. 25B, manufactured by MITSUBISHI CO. |
| 5 | No. 258, manufactured by MITSUBISHI CO. |
| 6 | VALCAN XC-72R, manufactured by CABOT CO. |

The properties of the ink compositions prepared according to above Examples and Comparative Examples were evaluated according to the following methods.

EXPERIMENTAL EXAMPLE 1

Test of Long-term Storage Stability 100 ml of the ink compositions prepared according to Examples 1-6 and Comparative Examples 1-6 were respectively placed into 12 heat resistant vials; the opening of the vials was closed, and the vials were stored in an incubator at a temperature of 60° C. After remaining in this state for 2 months, it was determined whether precipitates were formed at the bottom of the vials. The results shown in Table 3 below.

TABLE 3

|  | Examples | | | | | | Comparative Examples | | | | | |
|---|---|---|---|---|---|---|---|---|---|---|---|---|
| Number | 1 | 2 | 3 | 4 | 5 | 6 | 1 | 2 | 3 | 4 | 5 | 6 |
| Evaluation | ○ | ○ | ○ | ○ | ○ | ○ | ○ | X | ○ | X | X | ○ |

○: No Precipitates.
X: Precipitates occurred.

From Table 3, it may be seen that for the ink compositions according to the present invention, precipitates were not formed, even after standing for 2 months. Particularly, for the ink compositions prepared in Comparative Examples 2, 4 and 5, precipitates were observed, while for the ink compositions according to Examples 2, 4 and 5 using the self-dispersible carbon black pigments according to the present invention in which the hydrophilic group is incorporated into the general carbon black pigments used in Comparative Examples 2, 4 and 5, no precipitates were observed. From this result, it may be seen that the self-dispersible pigments prepared according to the present invention provided a significantly stable long-term storage stability compared to that of the conventional pigments.

EXPERIMENTAL EXAMPLE 2

Test of Dispersion Stability

The ink compositions prepared according to Examples 1-6 and Comparative Examples 1-6 were respectively measured to determine a time required to filter by pressure using a 1 μm porous membrane. Then, 50 ml of the ink compositions prepared according to Examples 1-6 and Comparative Example 1 were respectively placed into 100 ml PP (polypropylene) bottles, and the bottles were allowed to stand for 4 hours at 60° C. and for 4 hours at −40° C. This procedure was repeated 10 times (hereinafter referred to as "TC (Thermal Cycle)"), and then the time required for filtering by pressure using a 1 μm porous membrane was measured. The dispersion stability parameter A of each composition was evaluated by putting time measured before TC and time measured after TC into an equation below, and the results are shown in Table 4 below.

$$A = /\text{filtering time(before TC)} \times 100(\%)$$

TABLE 4

|  | Examples | | | | | | Comparative Examples | | | | | |
|---|---|---|---|---|---|---|---|---|---|---|---|---|
| No. | 1 | 2 | 3 | 4 | 5 | 6 | 1 | 2 | 3 | 4 | 5 | 6 |
| Evaluation | ○ | ○ | ○ | ○ | ○ | ○ | ○ | Δ | X | ○ | Δ | Δ |

○: A < 10 (superior dispersion stability)
Δ: 10 A < 20 (medium dispersion stability)
X: A > 20 (poor dispersion stability)

From Table 4, it may be seen that the ink compositions according to the present invention are dispersed without precipitation or aggregation even after TC, and thus have superior dispersion stability. Particularly, the parameter A of the ink compositions prepared in Comparative Examples 2, 5 and 6 is 10 to 20, the parameter A of the ink compositions prepared in Comparative Example 3 exceeds 20, while the parameter A of the ink compositions according to Examples 2, 3, 5 and 6 using the self-dispersible carbon black pigments according to the present invention in which the hydrophilic group is incorporated into the general carbon black pigments used in Comparative Examples 2, 3, 5 and 6 is less than 10. From this result, it may be seen that the self-dispersible pigments prepared according to the present invention provided remarkably improved dispersion stability compared to that of the conventional pigments.

EXPERIMENTAL EXAMPLE 3

Test of Nozzle Occlusion

The ink compositions prepared according to Examples 1-6 and Comparative Examples 1-6 were placed on a SAMSUNG ELECTRONICS CO. ink cartridge M-50, stood at an ambient temperature (25° C.) and low temperature (−18° C.) for 2 weeks, and then the degree by which a nozzle occluded such that it could not jet an ink when printing on a general paper (PREMIUM COPY PAPER, manufactured by SAMSUNG ELECTRONICS CO.) with a printer (MJC-2400C, manufactured by SAMSUNG ELECTRONICS CO.) was evaluated as follows. The results are shown in Table 5 below.

TABLE 5

|  | Examples | | | | | | Comparative Example | | | | | |
|---|---|---|---|---|---|---|---|---|---|---|---|---|
| No. | 1 | 2 | 3 | 4 | 5 | 6 | 1 | 2 | 3 | 4 | 5 | 6 |
| Evaluation (ambient Temp.) | ○ | ○ | ○ | ○ | ○ | ○ | Δ | X | ○ | Δ | ○ | ○ |
| Evaluation (low Temp.) | ○ | ○ | ○ | ○ | ○ | ○ | X | X | ○ | X | ○ | ○ |

○: The occlusion of all nozzles was not observed
Δ: The occlusion of 1 or 2 nozzles was observed
X: The occlusion of more than 3 nozzles was observed From Table 5, it may be seen that the ink compositions according to the present invention may be used without occlusion of nozzles even after stored at an ambient temperature or low temperature. Particularly, for the ink compositions prepared in Comparative Examples 1, 2 and 4, the occlusion of 1 or 2 nozzles, or more than 3 nozzles occurred while for the ink compositions according to Examples 1, 2 and 4 using the self-dispersible carbon black pigments according to the present invention in which the hydrophilic group is incorpo- rated into the general carbon black pigments used in Comparative Examples 1, 2 and 4, the occlusion of nozzles did not occur. From this result, it may be seen that the self-dispersible pigments prepared according to the present invention provided remarkably improved long-term storage stability compared to that of the conventional pigments.

The self-dispersible coloring agent according to the present invention may be prepared by incorporating a hydrophilic group into the coloring agent through a one-step process, and thus, the cost required in the process for preparing the self-dispersible coloring agent according to the present invention may be significantly decreased. The ink composition comprising the self-dispersible coloring agent according to the present invention provides superior long-term storage stability and dispersion stability since aggregation or precipitation does not occur in the composition even after long-term storage or variation of temperature without disturbing basic properties of pigments, such as durability, ability to embody a color, light resistance, and the like.

The self-dispersible coloring agent according to the present invention may be widely used as a pigment in fibers, leathers, furs, papers, foods, medicines, cosmetics, ink-jet inks, printing inks, paints, plastics, rubbers, furniture manufacturing, textile printing, paper manufacturing, cosmetics manufacturing, ceramic industry, and the like. Thus, the step of dispersing the coloring agent that is conventionally utilized may be greatly improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A process of preparing a self-dispersible coloring agent represented by formula (II) below by incorporating a hydrophilic group into a coloring agent through a reaction of a hydrophilic group containing halide represented by formula (I) below and the coloring agent in a presence of a Lewis acid catalyst:

$$X\text{-}L\text{-}R^1 \quad (I)$$

$$(\text{the coloring agent})\text{-}L\text{-}R^1 \quad (II)$$

wherein L represents a single bond or —C(=O)—;
$R^1$ is selected from the group consisting of a substituted or unsubstituted $C_1$-$C_{20}$ alkyl group containing a hydrophilic group, a substituted or unsubstituted $C_6$-$C_{20}$ aryl group containing a hydrophilic group, a substituted or unsubstituted $C_2$-$C_{20}$ heteroaryl group containing a hydrophilic group and a substituted or unsubstituted $C_7$-$C_{20}$ arylalkyl group containing a hydrophilic group; and X is one of: —F, —Br, —I and —Cl.

2. The process of claim 1, wherein the hydrophilic group is selected from the group consisting of —OA, —COOA, —SO$_2$A, —SO$_2$NH$_2$, —SO$_2$NHCOT$^1$, -T$^2$SO$_2$A, —SO$_3$A, —PO$_3$NH$_2$, —PO$_3$A$_2$, —NH$_2$ and —N(T$^1$)$_2$, wherein A is selected from the group consisting of a hydrogen atom, an alkali metal, and —NQ$^1$Q$^2$Q$^3$Q$^4$ in which Q$^1$, Q2, Q$^3$ or Q$^4$ are each one of: a hydrogen atom, a $C_1$-$C_{20}$ alkyl group and a $C_6$-$C_{20}$aryl group; T$^1$ is one of: a $C_1$-$C_{20}$ alkyl group, a $C_6$-$C_{20}$aryl group and a $C_2$-$C_{20}$ heteroaryl group; and T$^2$ is one of: a $C_1$-$C_{20}$ alkylene group, a $C_6$-$C_{20}$ arylene group and a $C_2$-$C_{20}$ heteroarylene group.

3. The process of claim 2, wherein the hydrophilic group is selected from the group consisting of —OH, —COOH, —SO$_2$H, —SO$_2$NH$_2$, —SO$_2$NHCOCH$_3$, —(CH$_2$)SO$_2$H, —SO$_3$H, —PO$_3$NH$_2$, —PO$_3$H$_2$, —NH$_2$ and —N(CH$_3$)$_2$.

4. The process of claim 1, wherein the $R^1$ is selected from the group consisting of a $C_1$-$C_{12}$ alkyl group; a $C_1$-$C_{12}$ alkyl group containing a phenyl group or a naphthyl group in the distal end; a phenyl group; and a naphthyl group.

5. The process of claim 1, wherein the coloring agent includes a $C_6$-$C_{15}$ aryl group or a $C_2$-$C_{15}$ heteroaryl group.

6. The process of claim 5, wherein the coloring agent includes one of: a ring of benzene, naphthalene, pyridine, purane, thiophene and pyrrole.

7. The process of claim 1, wherein the hydrophilic group-containing halide is a halide represented by formula (III) below:

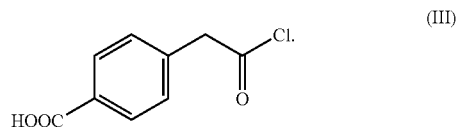

8. The process of claim 1, wherein the hydrophilic group-containing halide is a halide represented by formula (IV) below:

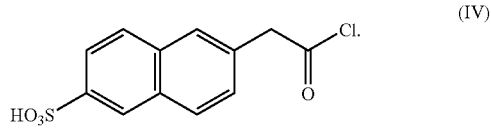

9. The process of claim 1, wherein the Lewis acid catalyst is at least one of: AlCl$_3$, FeCl$_3$, FeBr$_3$, SnCl$_4$, SbCl$_5$, ZnCl$_2$, BF$_3$ and TiCl$_4$.

10. The process of claim 1, wherein 0.01 to 5 mole of the Lewis acid catalyst per 1 mole of the hydrophilic group-containing halide is used.

11. The process of claim 1, wherein the process is carried out at a temperature of 60° C. to 200° C.

12. An ink composition comprising the self-dispersible coloring agent prepared by the process of claim 1.

13. The ink composition of claim 12, wherein the ink composition includes an aqueous liquid medium that comprises water alone, or water in combination with at least an organic solvent to form the aqueous liquid medium, and the ink composition comprises 500 to 5,000 parts by weight of the aqueous liquid medium based on 100 parts by weight of the self-dispersible coloring agent.

14. The ink composition of claim 12, further comprising one of a surfactant, a viscosity controller, an acid and a base.

15. A paint comprising the self-dispersible coloring agent prepared by the process of claim 1.

16. A toner composition comprising the self-dispersible coloring agent prepared by the process of claim 1.

17. The ink composition of claim 12, wherein the hydrophilic group is selected from the group consisting of —OA, —COOA, SO$_2$A, —SO$_2$NH$_2$, —SO$_2$NHCOT$^1$, -T$^2$SO$_2$A, —SO$_3$A, PO$_3$NH$_2$, PO$_3$A$_2$, —NH$_2$ and —N(T$^1$)$_2$, wherein A is selected from the group consisting of a hydrogen atom, an alkali metal, and —NQ$^1$Q$^2$Q$^3$Q$^4$ in which Q$^1$, Q$^2$, Q$^3$ or Q$^4$ are each one of: a hydrogen atom, a $C_1$-$C_{20}$ alkyl group and a $C_6$-$C_{20}$ aryl group; T$^1$ is one of: a $C_1$-$C_{20}$ alkyl group, a $C_6$-$C_{20}$ and a $C_2$-$C_{20}$ heteroaryl group; and T$^2$ is one of: a $C_1$-$C_{20}$ alkylene group, a $C_6$-$C_{20}$ arylene group and a $C_2$-$C_{20}$ heteroarylene group.

18. The ink composition of claim 17, wherein the hydrophilic group is selected from the group consisting of —OH, —COOH, —SO$_2$H, SO$_2$NH$_2$, SO$_2$NHCOCH$_3$, —(CH$_2$)SO$_2$H, —SO$_3$H, —PO$_3$NH$_2$, —PO$_3$H$_2$, —NH$_2$ and —N(CH$_3$)$_2$.

19. The ink composition of claim 12, wherein the R$^1$ is selected from the group consisting of a C$_1$-C$_{12}$ alkyl group; a C$_1$-C$_{12}$ alkyl group containing a phenyl group or a naphthyl group in the distal end; a phenyl group; and a naphthyl group.

20. The ink composition of claim 12, wherein the coloring agent includes a C$_6$-C$_{15}$ aryl group or a C$_2$-C$_{15}$ heteroaryl group.

21. The ink composition of claim 20, wherein the coloring agent includes one of: a ring of benzene, naphthalene, pyridine, purane, thiophene and pyrrole.

22. The ink composition of claim 12, wherein the hydrophilic group-containing halide is a halide represented by formula (III) below:

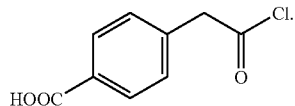

(III)

23. The ink composition of claim 12, wherein the hydrophilic group-containing halide is a halide represented by formula (IV) below:

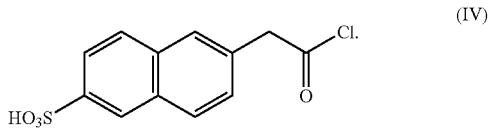

(IV)

24. The ink composition of claim 12, wherein the Lewis acid catalyst is at least one of: AlCl$_3$, FeCl$_3$, FeBr$_3$, SnCl$_4$, SbCl$_5$, ZnCl$_2$, BF$_3$ and TiCl$_4$.

25. The ink composition of claim 12, wherein 0.01 to 5 mole of the Lewis acid catalyst per 1 mole of the hydrophilic group-containing halide is used.

26. The ink composition of claim 12, wherein the process is carried out at a temperature of 60° C. to 200° C.

* * * * *

UNITED STATES PATENT AND TRADEMARK OFFICE
CERTIFICATE OF CORRECTION

PATENT NO. : 7,393,403 B2 Page 1 of 1
APPLICATION NO. : 10/926953
DATED : July 1, 2008
INVENTOR(S) : Jong-in Lee et al.

It is certified that error appears in the above-identified patent and that said Letters Patent is hereby corrected as shown below:

On the Title Page Item (73) (Assignee), change "Eletronics" to --Electronics--.

On the Title Page Item (57) (Abstract), change "and –Cl." to --and —Cl--.

Column 13, Line 58, after "in which $Q^1$," change "Q2," to --$Q^2$,--.

Column 14, Line 63, change "$C_6$-$C_{20}$ and" to --$C_6$-$C_{20}$ aryl group and--.

Signed and Sealed this

Twenty-first Day of October, 2008

JON W. DUDAS
*Director of the United States Patent and Trademark Office*